United States Patent
Sierra et al.

(10) Patent No.: US 10,831,484 B1
(45) Date of Patent: *Nov. 10, 2020

(54) RETURN-ORIENTED PROGRAMMING (ROP)/JUMP ORIENTED PROGRAMMING (JOP) ATTACK PROTECTION

(71) Applicant: Apple Inc., Cupertino, CA (US)

(72) Inventors: Yannick L. Sierra, San Francisco, CA (US); Jeffry E. Gonion, Campbell, CA (US); Thomas Roche, Paris (FR); Jerrold V. Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,490

(22) Filed: Jul. 29, 2019

Related U.S. Application Data (63) Continuation of application No. 15/202,269, filed on Jul. 5, 2016, now Pat. No. 10,409,600.

(60) Provisional application No. 62/286,650, filed on Jan. 25, 2016.

(51) Int. Cl.
    *G06F 9/30* (2018.01)
    *G06F 21/60* (2013.01)
    *G06F 12/14* (2006.01)

(52) U.S. Cl.
    CPC ...... *G06F 9/30123* (2013.01); *G06F 12/1408* (2013.01); *G06F 21/602* (2013.01); *G06F 2212/1052* (2013.01)

(58) Field of Classification Search
    CPC ............. G06F 9/30123; G06F 12/1408; G06F 21/602; G06F 9/322; G06F 12/14; G06F 21/52
    See application file for complete search history.

(56) References Cited

U.S. PATENT DOCUMENTS

| | | | |
|---|---|---|---|
| 7,308,576 B2 | 12/2007 | Glew et al. | |
| 7,720,939 B1 | 5/2010 | Leroy | |
| 8,635,406 B2 | 1/2014 | Greenhalgh | |
| 9,122,873 B2 | 9/2015 | Ghose | |
| 10,409,600 B1 | 9/2019 | Sierra | |
| 2004/0064457 A1* | 4/2004 | Zimmer | G06F 21/575 |

(Continued)

OTHER PUBLICATIONS

Tyler Bletsch et al, Jump-Oriented Programming: A New Class of Code-Reuse Attack, ACM (Year: 2011).*

(Continued)

*Primary Examiner* — Shanto Abedin
(74) *Attorney, Agent, or Firm* — Kowert, Hood, Munyon, Rankin & Goetzel, P.C.; Lawrence J. Merkel (57) ABSTRACT

In an embodiment, a processor includes hardware circuitry and/or supports instructions which may be used to detect that a return address or jump address has been modified since it was written to memory. In response to detecting the modification, the processor may be configured to signal an exception or otherwise initiate error handling to prevent execution at the modified address. In an embodiment, the processor may perform a cryptographic sign operation on the return address/jump address before writing the signed return address/jump address to memory and the signature may be verified before the address is used as a return target or jump target. Security of the system may be improved by foiling ROP/JOP attacks.

20 Claims, 4 Drawing Sheets

(56) References Cited

U.S. PATENT DOCUMENTS

| | | | | |
|---|---|---|---|---|
| 2005/0188214 A1* | 8/2005 | Worley | ................... | G06F 21/52 713/187 |
| 2007/0016832 A1 | 1/2007 | Weiss | | |
| 2008/0244114 A1* | 10/2008 | Schluessler | ............ | G06F 13/28 710/24 |
| 2008/0250217 A1 | 10/2008 | Kershaw et al. | | |
| 2012/0233612 A1 | 9/2012 | Beckett | | |
| 2014/0082329 A1* | 3/2014 | Ghose | ................... | G06F 9/3877 712/208 |
| 2014/0122846 A1 | 5/2014 | Vasekin | | |
| 2015/0040224 A1 | 2/2015 | Litva et al. | | |
| 2015/0046690 A1 | 2/2015 | Eickemeyer | | |
| 2016/0170769 A1 | 6/2016 | LeMay | | |
| 2016/0171211 A1* | 6/2016 | Chen | ....................... | G06F 21/54 726/23 |
| 2016/0188874 A1* | 6/2016 | Oxford | ................... | G06F 21/64 726/22 |
| 2016/0378499 A1* | 12/2016 | Burger | ................. | G06F 9/3806 712/234 |
| 2017/0024559 A1 | 1/2017 | Hughes et al. | | |

OTHER PUBLICATIONS

Law et al.; "Survey and Benchmark of Block Ciphers for Wireless Sensor Networks"; ACM Transactions on Sensor Networks (TOSN); ACM New York, NY, USA; vol. 2 Issue 1, Feb. 2006; pp. 65-93; 13 pages.

Borghoff et al.; "PRINCE: a Low-latency Block Cipher for Persuasive Computing Applications"; ASIACRYPT'12 Proceedings of the 18th international conference on the Theory and Application of Cryptology and Information Security; Springer-Verlag Berlin, Heidelberg; 2012; pp. 208-225; 25 pages.

Jean et al; "Security Analysis of PRINCE"; FSE 2013; Mar. 2013; Singapore; 13 pages.

U.S. Appl. No. 15/232,456, filed Aug. 9, 2016, Jeffry E. Gonion; 21 pages.

Watson, Robert NM, et al. "CHERI: a research platform deconflating hardware virtualization and protection." Workshop paper, Runtime Environments, Systems, Layering and Virtualized Environments (RESoLVE 2012). 2012; 8 pages.

U.S. Appl. No. 15/202,269, filed Jul. 5, 2016, Yannick L. Sierra, 23 pages.

Xu, Kui et al. "Probabilistic Program Modeling for High-Precision Anomaly Classification," IEEE (Year:2015).

* cited by examiner

RT = Sign([VA], RS, Key)
ystp(imm5, Key, RS1, RS2)
yst(imm5, Key, RS1)

Fig. 3

RT = Auth([VA], RS, Key)
RT1, RT2 = yldp(imm5, Key)
RT1 = yld(imm5, Key)

RETURN-ORIENTED PROGRAMMING (ROP)/JUMP ORIENTED PROGRAMMING (JOP) ATTACK PROTECTION

This application is a continuation of U.S. patent application Ser. No. 15/202,269, filed on Jul. 5, 2016 and now U.S. Pat. No. 10,409,600, which claims benefit of priority to U.S. Provisional Patent Application Ser. No. 62/286,650, filed on Jan. 25, 2016. The above applications are incorporated herein by reference in their entireties. To the extent that anything in the provisional application conflicts with material expressly set forth herein, the material expressly set forth herein controls.

BACKGROUND

Technical Field

Embodiments described herein are related to Return-Oriented Programming (ROP)/Jump Oriented Programming (JOP) attacks and mechanisms to prevent such attacks.

Description of the Related Art

ROP/JOP attacks are often used by nefarious programmers (e.g. "hackers") in an attempt to compromise the security of a system and thus gain control of the system. Generally, the ROP/JOP attacks involve using overflows of variables on a stack to disrupt execution flow, leading to privilege escalation and privileged code execution. The ROP/JOP attacks further include modifying return addresses on the stack (ROP) or jump addresses on the stack or elsewhere in memory (JOP), causing execution to return to a different program location than the original return address/jump address would indicate. By finding various instructions, or short instructions sequences, followed by returns or jumps in the code on a machine (e.g. operating system code), the ROP/JOP attacker can build a list of "instructions." Once the list of instructions forms a Turing Machine, the list can be used by a compiler to compile code to perform the tasks desired by the nefarious programmer.

SUMMARY

In an embodiment, a processor includes hardware circuitry and/or supports instructions which may be used to detect that a return address or jump address has been modified since it was written to memory. In response to detecting the modification, the processor may be configured to signal an exception or otherwise initiate error handling to prevent execution at the modified address. In an embodiment, the processor may perform a cryptographic sign operation on the return address/jump address before writing the signed return address/jump address to memory and the signature may be verified before the address is used as a return target or jump target. Security of the system may be improved by foiling ROP/JOP attacks.

BRIEF DESCRIPTION OF THE DRAWINGS

The following detailed description makes reference to the accompanying drawings, which are now briefly described.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Figure 1:
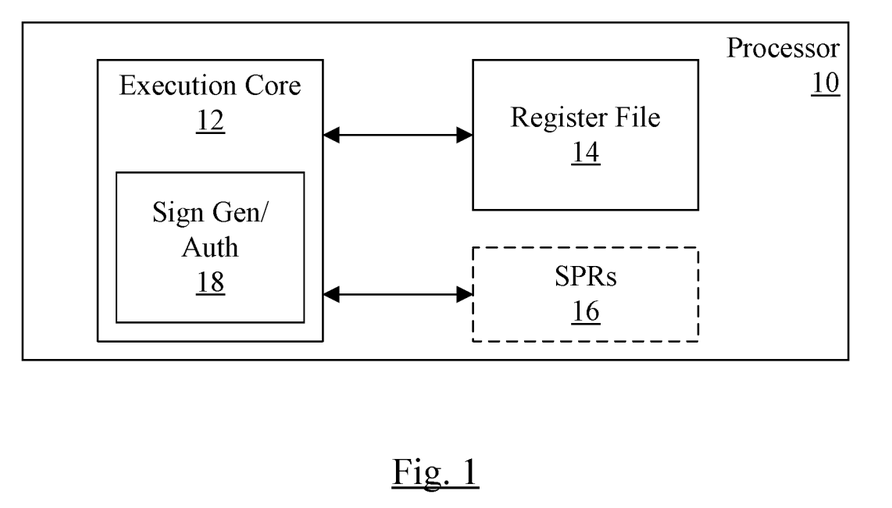
FIG. 1 is a block diagram of one embodiment of a processor.

Turning now to FIG. 1, a block diagram of one embodiment of a processor 10 is shown. In the embodiment of FIG. 1, the processor 10 may include an execution core 12 coupled to a register file 14 and optionally one or more special purpose registers 16.

The processor 10 may be representative of a general-purpose processor that performs computational operations. For example, the processor 10 may be a central processing unit (CPU) such as a microprocessor, a microcontroller, an application-specific integrated circuit (ASIC), or a field-programmable gate array (FPGA). The processor 10 may be a standalone component, or may be integrated onto an integrated circuit with other components (e.g. other processors, or other components in a system on a chip (SOC)). The processor 10 may be a component in a multichip module (MCM) with other components.

As illustrated in FIG. 1, the processor 10 may include the execution core 12. The execution core 12 may be configured to execute instructions defined in an instruction set architecture implemented by the processor 10. The execution core 12 may have any microarchitectural features and implementation features, as desired. For example, the execution core 12 may include superscalar or scalar implementations. The execution core 12 may include in-order or out-of-order implementations, and speculative or non-speculative implementations. The execution core 12 may include any combination of the above features. The implementations may include microcode, in some embodiments. The execution core 12 may include a variety of execution units, each execution unit configured to execute operations of various types (e.g. integer, floating point, vector, multimedia, load/store, etc.). The execution core 12 may include different numbers pipeline stages and various other performance-enhancing features such as branch prediction. The execution core 12 may include one or more of instruction decode units, schedulers or reservations stations, reorder buffers, memory management units, I/O interfaces, etc.

The register file 14 may include a set of registers that may be used to store operands for various instructions. The register file 12 may include registers of various data types, based on the type of operand the execution core 12 is configured to store in the registers (e.g. integer, floating point, multimedia, vector, etc.). The register file 14 may include architected registers (i.e. those registers that are specified in the instruction set architecture implemented by the processor 10). Alternatively or in addition, the register file 14 may include physical registers (e.g. if register renaming is implemented in the execution core 12).

The special purpose registers 16 may be registers provided in addition to the general purpose registers. While general purpose registers may be an operand for any instruction of a given data type, special purpose registers are generally operands for particular instructions or subsets of instructions. For example, in some embodiments, a program counter register may be a special purpose register storing the fetch address of an instruction. A link register may be a register that stores a return address, and may be accessible to branch instructions. While the special purpose registers 16 are shown separate from the register file 14, they may be integrated into the register file 14 in other embodiments. In some embodiments, certain general purpose registers may be reserved by compiler convention or other software convention to store specific values (e.g. a stack pointer, a frame pointer, etc.).

The processor 10 may be configured to perform sign and authenticate operations on return addresses and/or jump addresses, to detect whether or not the addresses have been modified between the time they were created/stored and the time they are to be used as a target. The addresses may be signed when written to memory, in some embodiments. For example, return addresses for subroutine calls may be written to the stack in memory. Jump addresses may be written to an arbitrary memory location, in the stack or outside the stack, for later retrieval. When the addresses are later retrieved to be used as a jump/return target address, the processor 10 may be configured to perform an authenticate operation on the addresses. Error handling may be initiated if the authenticate operations fails, instead of using the address as a fetch address (e.g. branching to the address). In an embodiment, sign and authenticate operations may be performed on the addresses in registers as well. For example, a general purpose register in the register file 14 may be used as a source for a return address or jump address, and may be signed and authenticated. A special purpose register 16 such as a link register may be signed and authenticated, in some embodiments. Performing a sign operation on a value may be more succinctly referred to herein as "signing" the value. Similarly, performing an authenticate operation on a value may be more succinctly referred to herein as "authenticating." In an embodiment, data pointers (addresses to data in memory, where the data is operated upon during instruction execution in the processor 10) may also been signed and authenticated.

Generally performing a sign operation or "signing" an address may refer to applying a cryptographic function to the address using at least one cryptographic key and optionally using additional data. The result of the cryptographic function is a signature. By applying the cryptographic function again at a later point and comparing the resulting value to the signature, an authenticate operation may be performed on the address (or the address may be "authenticated"). That is, if the address and/or signature have not been modified, the result of the cryptographic function should equal the signature. The cryptographic key may be specific to the thread that includes the generation of the address and the use of the address as a target, and thus the likelihood of an undetected modification by a third party without the key may be exceedingly remote. The cryptographic key may be generated, at least in part, based on a "secret" that is specific to the instance of the processor 10 and is not accessible except in hardware. The cryptographic key itself may also not be accessible to software, and thus the key may remain secret and difficult to discover by a third party.

In an embodiment, the optional additional data used in the sign and authentication of the return/jump address may include an address at which the return/jump address is stored. For example, a virtual address of the location may be used (e.g. the virtual stack pointer, for storage of the address on the stack, or a virtual address to the memory location for any other memory location). Other embodiments may use the physical address.

The cryptographic function applied to the return/jump address may be an encryption of the address using the key(s). The encrypted result as a whole may be the signature, or a portion of the result may be the signature (e.g. the signature may be shortened via truncation or shifting). Any encryption algorithm may be used, including a variety of examples given below.

An instruction may be an executable entity defined in an instruction set architecture implemented by the processor 10. There are a variety of instruction set architectures in existence (e.g. the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 10. Some instructions may be microcoded, in some embodiments. Accordingly, the term "instruction operation" may be used herein to refer to an operation that an execution unit in the processor 10/execution core 12 is configured to execute as a single entity. Instructions may have a one to one correspondence with instruction operations, and in some cases an instruction operation may be an instruction (possibly modified in form internal to the processor 10/execution core 12). Instructions may also have a one to more than one (one to many) correspondence with instruction operations. An instruction operation may be more briefly referred to herein as an "op."

Figure 2:
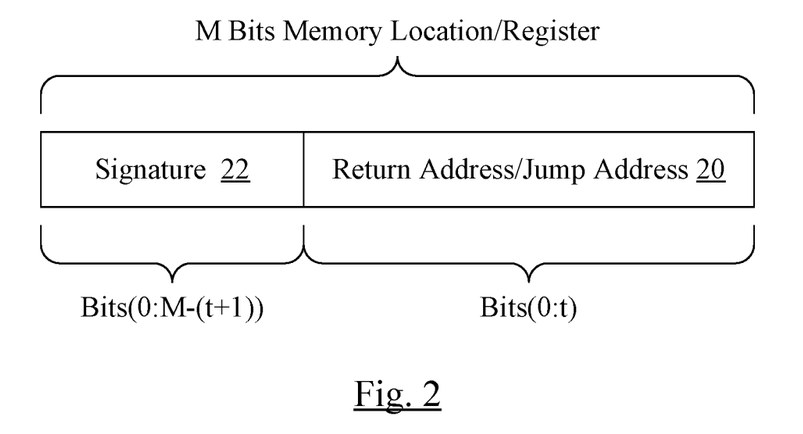
FIG. 2 is a block diagram of one embodiment of a register/memory location for a return/jump address.

Turning now to FIG. 2, a block diagram illustrating one embodiment of an M bit memory location or register is shown. M may be an integer greater than zero. More particularly, M may be the architectural size of a virtual address in the processor 10. For example, some instruction set architectures specify 64 bit addresses currently. However, the actual implemented size may be less (e.g. 40 to 48 bits of address). Thus, some of the address bits are effectively unused in such implementations. The unused bits may be used to store the signature for the address, in an embodiment. Other embodiments may store the signature in another memory location.

In the embodiment of FIG. 2, t+1 bits of return address or jump address are implemented (field 20), where t is less than M and is also an integer. The remaining bits of the register/memory location store the signature (field 22). The signature as generated from the encryption algorithm may be larger than the signature field 22 (e.g. larger than M−(t+1) bits). Accordingly, the signature actually stored for the address may be a portion of the signature. For example, the signature may be truncated. Alternatively, the signature may be right-shifted. Any mechanism for shortening the signature field may be used.

Figure 3:
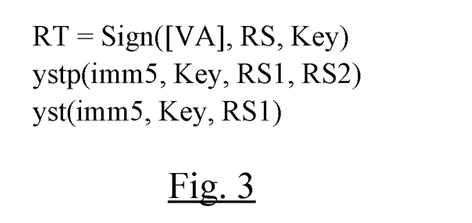
FIG. 3 is an example of instructions that sign a return/jump address.
Figure 4:
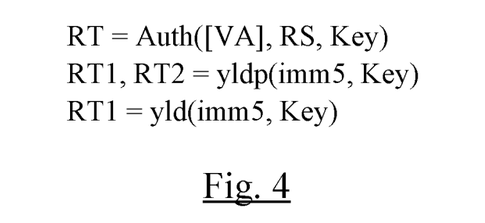
FIG. 4 is an example of instructions that authenticate a signed return/jump address.

The processor 10 may implement the signature generation and authentication in hardware. For example, signature generation/authentication circuit 18 is shown in FIG. 1 and may include circuitry to sign and authenticate return addresses and jump addresses. Additionally, there may be instructions defined for the instruction set architecture which cause the signature to be generated or authentication to be performed. FIGS. 3 and 4 illustrate embodiments of instructions for signature generation and authentication, respectively.

FIG. 3 illustrates several embodiments of signature generation instructions. For example, a Sign instruction takes as input operands an optional virtual address (VA), a source register (RS), and a key. The virtual address may be in a register as well. The key may be stored in a hardware-accessible register or other storage device for access by the hardware only. The key may be one key, or multiple keys, depending on the encryption algorithm that is implemented by the processor 10.

The Sign instruction may apply an encryption algorithm to the data (e.g. the RS and the VA, in this case) producing a signature which may be written to a target register RT. When more than one datum is provided, the data may be combined prior to the encryption (e.g. the RS and the VA may be logically combined according to any desired logic function) and the resulting data may be encrypted. Alternatively, the data may be concatenated and encrypted using multiple passes of a block encryption (block cipher) mechanism. Any type of encryption may be used, including any type of block encryption such as advanced encryption standard (AES), data encryption standard (DES), international data encryption algorithm (IDEA), PRINCE, etc. A factor in determining the encryption algorithm to be used is latency of the algorithm. Accordingly, a single pass of encryption may be selected that is strong enough to protect the encrypted data to a desired level of security. A signature resulting from the encryption may then be shortened to match the field 22. The result in the target register may be of the form shown in FIG. 2.

As mentioned above, the virtual address may be an optional part of the signature generation. Inclusion of the virtual address provides information related to the location at which the return address/jump address is stored. Accordingly, if the signed return address/jump address is moved and later retrieved from a different location, authentication with the virtual address of the new location may fail. In some cases, it may be desirable for the signed address to be moved (e.g. when used in shared libraries, for example). In such cases, the virtual address may not be included in the signature generation nor in the corresponding authentication. In such cases, a constant value such as zero may be used in place of the virtual address. In the case of a data pointer, the constant value of zero may be used as well.

Another embodiment of the signature generation instruction may operate on data being stored to memory. For example, the ystp instruction shown in FIG. 3 may store a pair of registers RS1 and RS2 to a location in the stack identified by the immediate field imm5. That is, the imm5 field may be an offset from the stack pointer. The ystp instruction may also sign at least one of the register values, or both in another embodiment, using the key and the selected encryption algorithm (and optionally the virtual address to which the pair is being stored, e.g. the stack pointer plus the imm5 field). The pair of registers may be, e.g., general purpose registers that are often used by a compiler for the processor 10 as the frame pointer and the link register. The link register may be signed in response to the instruction, and the signed value may be stored to memory. While the ystp instruction stores a pair of registers to memory, a corresponding yst instruction may be defined that stores one register to memory (and generates a signature for the register data). Other instructions may store other numbers of registers to memory, and may generate signatures for any subset or all of the registers. Furthermore, other instructions may use other addressing modes and need not store the signed addresses on the stack.

FIG. 4 illustrates several embodiments of the authentication instructions. For example, an Auth instruction takes as input operands an optional virtual address (VA), a source register (RS), and a key or keys. The virtual address may be in a register as well. The key(s) may be stored in a hardware-accessible register(s) or other storage device(s) for access by the hardware only.

The Auth instruction may apply the same encryption algorithm as the Sign instruction to the virtual address and the return/jump address field 20 of the source register data (e.g. the RS and the VA, in this case) producing a signature which may be written to a target register RT. The resulting signature may be compared to the signature field 22 of the source register data (shortened in the same fashion as the original signature was shortened). If the signatures do not match, the authentication fails and return/jump to the address is prevented. If the signatures match, the authentication passes and return/jump to the address is permitted. The return/jump may be prevented, e.g., by taking an exception. In the case of a data pointer, if the authentication fails, an exception may be signaled instead of permitting the data pointer to be used. Using the data pointer is referred to as dereferencing the data pointer.

Another embodiment of the authentication instruction may operate on data being read from memory. For example, the yldp instruction shown in FIG. 4 may load a pair of registers RT1 and RT2 from a location in the stack identified by the immediate field imm5. That is, the imm5 field may be an offset from the stack pointer. The yldp instruction may also authenticate at least one of the register values, or both in another embodiment, using the key(s) and the selected encryption algorithm (and optionally the virtual address from which the pair is being read, e.g. the stack pointer plus the imm5 field). The pair of registers may be, e.g., general purpose registers that are often used by a compiler for the processor 10 as the frame pointer and the link register. The link register may be authenticated in response to the instruction, and an exception may be signaled if the authentication fails. While the yldp instruction reads a pair of registers from memory, a corresponding yld instruction may be defined that reads one register from memory (and authenticates the data). Other instructions may load other numbers of registers from memory, and may authenticate any subset or all of the registers, and may use other addressing modes and may store addresses elsewhere than on the stack.

In an embodiment, it may be desirable to remove the signature from the address without authenticating the address. A strip instruction may be defined that may remove the signature and replace it with the original bits from the address (e.g. a sign extension of the address field 20, or zeros).

Figure 5:
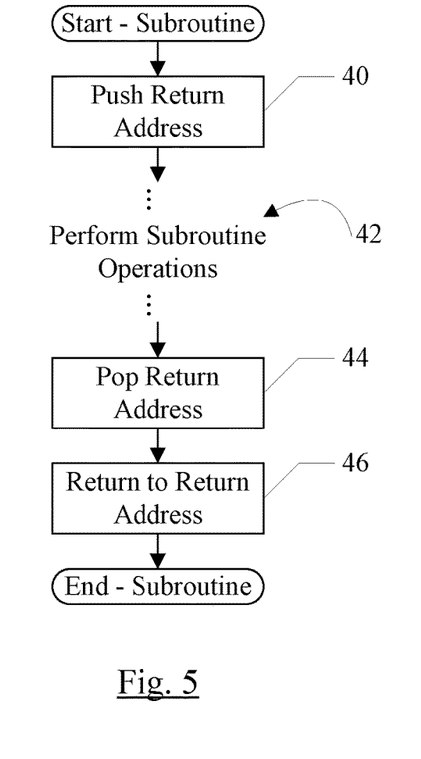
FIG. 5 is a flowchart illustrating an exemplary subroutine.

Turning next to FIG. 5, a flowchart is shown illustrating an exemplary subroutine that may be executed by the processor 10 in a system. While the blocks are shown in a particular order for ease of understanding, other orders may be used. Instructions executed by the processor 10 and/or hardware in the processor 10 may implement the operation shown in FIG. 5.

The processor 10 may push the return address for the subroutine onto the stack (block 40). The push may occur in the calling code, before jumping to the address of the subroutine, or may occur within the subroutine. Additional details regarding some embodiments of pushing the return address are described below with regard to FIG. 6. The subroutine may include instructions that perform the operation(s) for which the subroutine is designed (indicated generally at reference numeral 42). The subroutine may pop the return address from the stack (block 44) and return to the return address (block 46). That is, the return address may be used as a fetch address to fetch the next instructions to execute in the processor 10. Additional details regarding some embodiments of pushing the return address are described below with regard to FIG. 7.

Figure 6:
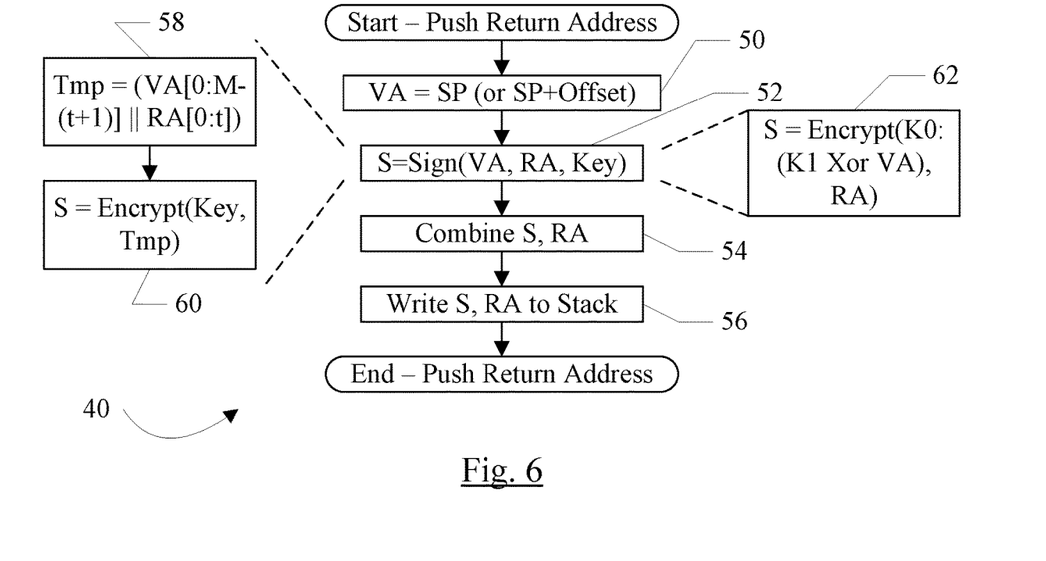
FIG. 6 is a flowchart illustrating the pushing of a return address for one embodiment.

Turning now to FIG. 6, a flowchart is shown illustrating one embodiment of pushing a return address (e.g. block 40 in FIG. 5). While the blocks are shown in a particular order for ease of understanding, other orders may be used. Instructions executed by the processor 10 and/or hardware in the processor 10 may implement the operation shown in FIG. 6.

The virtual address (VA) to be used in signing the return address in this case may be the stack pointer (SP, or alternatively, the stack pointer added to an offset which identifies the location at which the return address is to be pushed) (block 50). The signature based on the VA, the return address (RA), and the key may be generated by applying the selected encryption algorithm to the data (block 52). The generated signature may be combined with the return address to form the signed return address (e.g. as shown in FIG. 2) (block 54). The signed return address may be pushed onto the stack (block 56).

Two embodiments of the signature generation block 52 are shown in exploded view to either side of block 52. On the left side, a temporary value may be formed by concatenating bits of the virtual address to the implemented portion of the return address. That is, if t+1 bits of return address are implemented, M−(t+1) bits of the virtual address may be concatenated (block 58). The temporary value may be encrypted using the key and the selected encryption algorithm to generate the signature (block 60). Alternatively, the virtual address and the return address may be encrypted in multiple passes of a block encryption algorithm. In the embodiment on the right side, an encryption algorithm that uses a key pair (K0 and K1) is shown (block 62). K0 may be a "whitening" key, while K1 may be a "core" key. The core key may be used in the iterations of the block cipher, and the whitening key may be used before and/or after the iterations are complete to further modify the data. In the embodiment illustrated, the K1 key is combined with the VA (e.g. by XOR) to form the core key used for the encryption. Any form of encryption may be used in various embodiments. In an embodiment, the PRINCE algorithm may be used. In an embodiment, any tweakable block cipher may be used as the encryption algorithm, where the VA is used as the tweak. Generally, various embodiments may use the block cipher to achieve a symmetric signature scheme (or message authentication code (MAC)).

Figure 7:
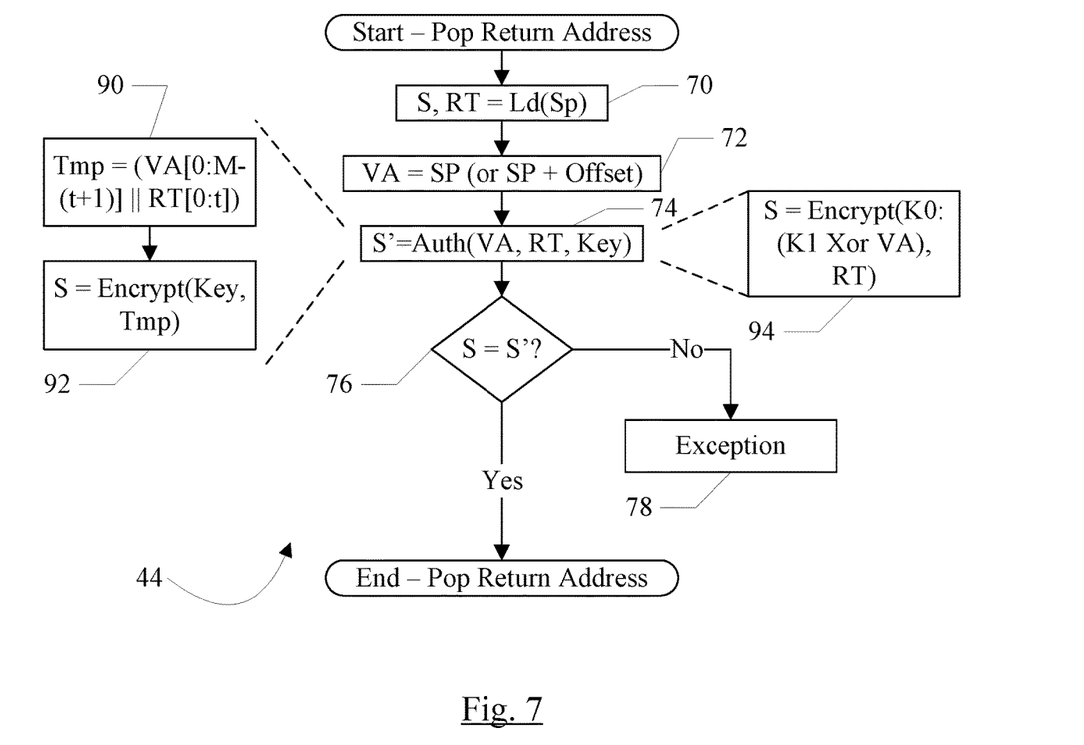
FIG. 7 is a flowchart illustrating the popping of a return address for one embodiment.

Turning now to FIG. 7, a flowchart is shown illustrating one embodiment of popping a return address (e.g. block 44 in FIG. 5). While the blocks are shown in a particular order for ease of understanding, other orders may be used. Instructions executed by the processor 10 and/or hardware in the processor 10 may implement the operation shown in FIG. 7.

The signed return address may be loaded from the stack memory location into a target register (block 70), wherein S is the original signature. Similar to the original signature generation, the VA may be set to the stack pointer (or the stack pointer plus an offset to the location of the return address) (block 72). The signed return address may be authenticated by applying the same operation that was applied when the return address was initially signed, and comparing the generated value to the signature (block 74). If the signature remains valid (i.e. the signature S' generated in the authentication matches the original signature S in the address) (decision block 76, "yes" leg), the return address may be used and thus operation may proceed to block 46 in FIG. 5. Otherwise (decision block 76, "no" leg), the processor 10 may signal an exception to prevent the return address from being used (block 78).

In exploded view to the left and right of block 74 are embodiments of authentication that correspond to the embodiments of signing illustrated to the left and right of block 52 in FIG. 6, respectively. Thus, on the left side, a temporary value may be formed by concatenating bits of the virtual address to the implemented portion of the return address. That is, if t+1 bits of return address are implemented, M−(t+1) bits of the virtual address may be concatenated (block 90). The temporary value may be encrypted using the key and the selected encryption algorithm to generate the signature (block 92). Alternatively, the virtual address and the return address may be encrypted in multiple passes of a block encryption algorithm. In the embodiment on the right side, an encryption algorithm that uses a key pair (K0 and K1) is shown (block 62). K0 may be a "whitening" key, while K1 may be a "core" key. The core key may be used in the iterations of the block cipher, and the whitening key may be used before and/or after the iterations are complete to further modify the data. In the embodiment illustrated, the K1 key is combined with the VA (e.g. by XOR) to form the core key used for the encryption. Any form of encryption may be used in various embodiments. In an embodiment, the PRINCE algorithm may be used.

Figure 8:
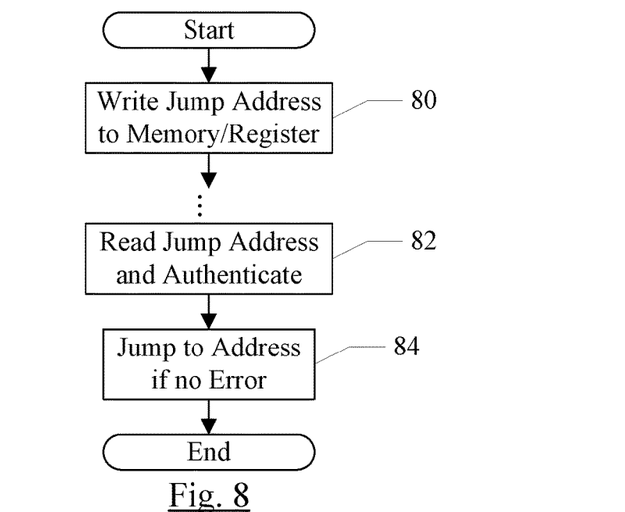
FIG. 8 is a flowchart illustrating jump address signing and authentication.

The flowcharts of FIGS. 5-7 illustrating the protection of a return address on the stack from ROP attack. A similar mechanism may be used for jump addresses, except that that address may be stored at any memory location (e.g. not necessarily on the stack) or in a register. In the case of a memory location, the VA may be the virtual address of the memory location. In the case of a register, there may be no VA or the register address may be used as the "VA." FIG. 8 is a flowchart illustrating the high level operation of the jump address signature and authentication, similar to the flowchart of FIG. 5 for the return address. While the blocks are shown in a particular order for ease of understanding, other orders may be used. Instructions executed by the processor 10 and/or hardware in the processor 10 may implement the operation shown in FIG. 8.

The jump address may be generated and written to memory or a register (block 80). Block 80 may be performed similar to the flowchart of FIG. 6, except that the signed address is written to an arbitrary memory location (not necessarily the stack) or a register. Subsequently, the jump address may be read and authenticated (block 82). Block 82 may be performed similar to the flowchart of FIG. 7, except at the signed address again need not be in the stack (and may be in a register). If there is not error in the authentication, the jump address may be used.

As mentioned previously, one embodiment of the encryption algorithm may be the PRINCE algorithm. The PRINCE algorithm employs a 128 bit key, which is expressed as two 64 bit keys K0 and K1 (as discussed above). The 128 bit key is expanded to 192 bits by generating a K0'. K0' is the exclusive OR of K0 right rotated by one and K0 right shifted by 63. PRINCE is based on the so-called FX construction [7, 30]: the first two subkeys K0 and K0' are whitening keys, while the key K1 is the 64-bit key for a 12-round block cipher referred to as PRINCE$_{core}$. The 12 rounds may be unrolled so that the latency of the cipher is 1 clock cycle, in some embodiments. Additional details of the PRINCE algorithm are provided in the paper "PRINCE—A Low-latency Block Cipher for Pervasive Computing Applications" by Borghoff et al., published in Xiaoyun Wang and Kazue Sako, editors. Advances in Cryptology—ASIACRYPT 2012-18th International Conference on the Theory and Application of Cryptology and Information Security, Beijing, China, Dec. 2-6, 2012, pages 208-225.

Figure 9:
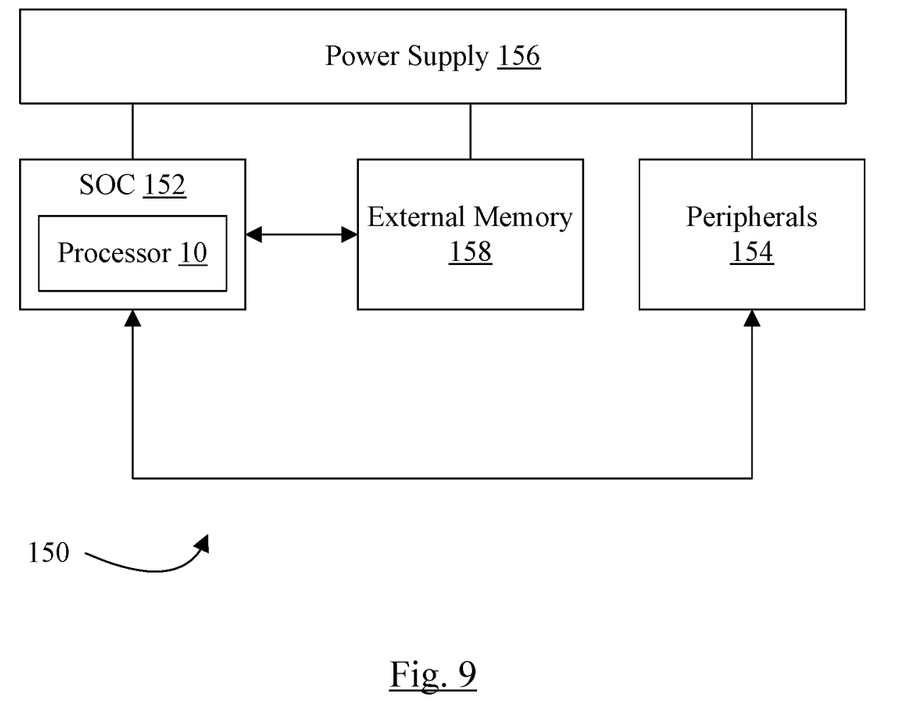
FIG. 9 is a block diagram of one embodiment of a system including the processor shown in FIG. 1.

Turning next to FIG. 9, a block diagram of one embodiment of a system 150 is shown. In the illustrated embodiment, the system 150 includes at least one instance of a system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of the processor 10 as illustrated in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 152 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A processor comprising:
one or more registers; and
an execution core coupled to the one or more registers, wherein the execution core is configured to perform a cryptographic sign operation on a data pointer using a cryptographic key to generate a second data pointer, and wherein the execution core is configured to store the second data pointer to a location, and wherein the execution core is configured to perform an authenticate operation on the second data pointer prior to dereferencing the data pointer to data in memory, wherein the data is operated upon during execution of a subsequent instruction by the execution core, wherein the authenticate operation verifies that the second data pointer has not been changed in the location prior to dereferencing the data pointer.

2. The processor as recited in claim 1 wherein the location is a memory location.

3. The processor as recited in claim 2 wherein the memory location is in a stack in memory.

4. The processor as recited in claim 2 wherein at least a portion of a virtual address of the memory location is an input to the cryptographic sign and the authenticate operations.

5. The processor as recited in claim 4 wherein at least a portion of the virtual address is cryptographically combined with the cryptographic key.

6. The processor as recited in claim 1 wherein the location is one of the one or more registers.

7. The processor as recited in claim 1 wherein a signature generated from the sign operation is reduced in size replaces a subset of bits of the second data pointer in the location.

8. The processor as recited in claim 1 wherein the execution core is configured to execute an instruction defined to perform the cryptographic sign operation.

9. The processor as recited in claim 8 wherein the instruction is a store instruction that is defined to write the second data pointer to memory.

10. The processor as recited in claim 9 wherein the store instruction is a store pair instruction that is defined to write a pair of values to memory.

11. The processor as recited in claim 1 wherein the execution core is configured to execute an instruction defined to authenticate the second data pointer.

12. The processor as recited in claim 11 wherein the instruction is a load instruction that is defined to read the second data pointer from memory.

13. The processor as recited in claim 12 wherein the load instruction is a load pair instruction that is defined to read a pair of values from memory.

14. A processor comprising:
an execution core configured to perform a cryptographic sign operation on an address using a cryptographic key to generate a signed address, wherein the execution core is configured to store the signed address to a location for subsequent use and, prior to the subsequent use of the address in response to the execution core executing a subsequent instruction by dereferencing the address as a data pointer, the execution core is configured to perform an authenticate operation with the cryptographic key on the signed address read from the location, wherein the authenticate operation verifies that the address has not been changed prior to dereferencing the data pointer during execution of the subsequent instruction to obtain data in memory, wherein the data is to be operated upon by the processor during execution of another subsequent instruction by the execution core.

15. The processor as recited in claim 14 wherein the data pointer points to a memory location storing data to be operated upon by the execution core in response to execution of the subsequent instruction.

16. A method comprising:
generating an address of a memory location in a processor, wherein the address is a data pointer to be dereferenced to obtain data to be operated upon by the processor;
performing a cryptographic sign operation on the address using a cryptographic key to generate a signed address;
detecting an attempt to dereference the data pointer to access the memory location to obtain the data, wherein the data is operated upon responsive to execution of a subsequent instruction in the processor;
authenticating the signed address with the cryptographic key responsive to detecting the attempt, wherein the authenticating is performed on the signed address read from a second memory location in response to executing an instruction subsequent to generating the signed address; and
preventing dereferencing of the data pointer during execution of the instruction responsive to a failure in authenticating the signed address.

17. The method as recited in claim 16 further comprising permitting dereferencing of the data pointer during execution of the instruction responsive to successfully authenticating the signed address.

18. The method as recited in claim 17 wherein successfully authenticating the signed address indicates that the address has not been changed in the second memory location.

19. The method as recited in claim 17 wherein the second memory location is in a stack in memory.

20. The method as recited in claim 17 wherein the second memory location is a register.

* * * * *